United States Patent [19]

Lincoln et al.

[11] 3,716,484

[45] Feb. 13, 1973

[54] PROCESS FOR SUBSTANTIAL REMOVAL OF PHOSPHATES FROM WASTEWATERS

[75] Inventors: Patrick A. Lincoln, St. Louis; Philip G. Delamater, Alma, both of Mich.

[73] Assignee: Michigan Chemical Corporation, St. Louis, Mich.

[22] Filed: May 10, 1971

[21] Appl. No.: 142,032

[52] U.S. Cl. ................................................. 210/52
[51] Int. Cl. ................................................. C02c 1/40
[58] Field of Search ....................... 210/3–10, 52, 53, 210/59; 23/109

[56] References Cited

UNITED STATES PATENTS

| | | | |
|---|---|---|---|
| 3,431,200 | 3/1969 | Davis et al. | 210/10 |
| 3,462,360 | 8/1969 | McKinney | 210/14 X |
| 3,440,165 | 4/1969 | Davis et al. | 210/45 X |
| 3,385,785 | 5/1968 | Forrest et al. | 210/18 X |
| 3,617,569 | 11/1971 | Daniels et al. | 210/53 X |
| 3,423,309 | 1/1969 | Albertson | 210/53 X |

*Primary Examiner*—Michael Rogers
*Attorney*—James J. Mullen

[57] ABSTRACT

The invention is directed to a process for removing substantial amounts of soluble phosphates from wastewaters at primary treatment stages by means of chemical precipitation utilizing calcium chloride at a pH of 8–9.5, or a combination of calcium chloride and calcium hydroxide. An equivalent amount of calcia may be used in place of the calcium hydroxide.

3 Claims, No Drawings

PROCESS FOR SUBSTANTIAL REMOVAL OF PHOSPHATES FROM WASTEWATERS

The present invention relates to treatment and clarification of raw wastewaters and sewage effluents. More specifically, the invention is concerned with removal of soluble phosphates by the substantial precipitation thereof from wastewaters utilizing calcium chloride or a combination of calcium chloride and calcium hydroxide.

Recently, much concern has been shown over the quality of water found in our streams and lakes. It seemed that the extent and the degree of water pollution were accelerating at uncontrollable rates, which have, in many instances caused various governmental agencies to institute stringent measures and requirements regarding wastewaters and sewage effluents.

Treatment of wastewaters and sewage effluents before discharging the same into a river, lake or sea is a relatively new practice. In fact the majority of industrial wastewaters have gone untreated. Thus with the advent of industrial growth and population increase the in-take of pollutants by the various bodies of water could not be off-set by natural dissemination. Consequently, the nutriently rich flow of wastewaters has given rise to the growth of algae which on decomposition deplete oxygen essential to marine and fish life. This process of successive enrichment and suffocation of a lake is called eutrophication which is believed to threaten many bodies of water.

The nutrients found in wastewaters and sewage effluents comprise a variety of chemical compounds notable of which are phosphates and nitrates. Uses of phosphates and phosphorus-containing compounds in consumer and agricultural products have been one of the main contributors to such pollution. Means for removing these nutrient compounds are therefore essential from the ecological point of view. As to phosphates, most governmental standards require only 80% removal.

In most water-treatment plants removal of phosphates can be incorporated as a step in the over-all process. In fact that is usually done wherever a secondary treatment is involved. This is in contrast to the processes involving primary treatment which utilizes sedimentation of the wastewater or its passage through some filtering means to remove most suspended solids. As can be seen, primary treatments cannot remove any soluble materials, particularly phosphates. Secondary treatment involves further treatment of the effluent from the primary treatment attempting to reduce the dissolved solids by means of precipitating, coagulating and/or flocculating agents followed by trickling filters, digestors or the like. Because of their efficiency and low cost, digestors utilizing the activated-sludge method has been widely adopted by many water-treatment facilities since this method takes advantage of the bacteria and microorganisms found in wastewaters to collect or digest the dissolved and colloidal organic matter. On settling, the sludge is collected and may be treated and used as fertilizer or otherwise disposed of, such as by burying or land-filling. Use of the activated-sludge, however, requires the proper maintenance and control of several parameters and conditions such as the pH and "BOD". "BOD" is a term referring to biological oxygen demand which is a value indicating the amount of oxygen required in the biological decomposition of the organic matter present. Thus it is important to keep the "BOD" value as low as possible in the treated effluent.

The present invention contemplates a water-treatment system which utilizes a chemical process to precipitate phosphates, especially in connection with a digestor-activated sludge treatment step, although it may find use in connection with other treatments. In one of its principal aspects, the invention is directed to a chemical process for removing the bulk of dissolved phosphates in wastewaters. In the prior art a variety of precipitating agents have been used such as lime, alum, ferric chloride, and both ferrous and ferric sulfates. The iron salts are particularly useful because of their flocculent characteristics except for their excessive cost which burdens financially the over-all treatment. Lime has been used extensively to precipitate phosphates as it affords economic advantages not available with the others. Unfortunately lime has been shown to affect adversely the digestor-activated sludge process because it makes the effluent from the primary treatment stage too alkaline. It is well known that most bacterial forms cannot survive long in media having pH values in excess of 9.5–10.0. Thus the advantage provided by the action of the micro-organisms in the activated-sludge is impaired substantially. Considering the fact that the effluent from the primary treatment is expected to flow on a continuous basis, any impaired stage thereafter presents very serious problems such as stoppage or disposing the effluents improperly. It is for this reason that many water-treatment plants dislike the use of lime as means for precipitating phosphates. Lime or calcium hydroxide is a very strong base making pH adjustment very difficult particularly when it is realized that it operates best at pH of 9.5.

Thus to use an inexpensive precipitating agent such as calcium hydroxide will require additional expenses in equipment and personnel to monitor the alkalinity of the influent stream from the primary treatment into the digestor tank and consequently the economic advantage is lost. In this connection it should be appreciated that water-treatment plants utilizing secondary stages other than activated-sludge cannot tolerate effluents having pH values in excess of 9.5. The reason for this is regulatory in that water disposed in lakes or rivers should be close to neutral, i.e., neither too alkaline nor too acidic.

Accordingly the main object of the present invention is to provide an agent for precipitating phosphates which is inexpensive and can be incorporated in present processes without additional cost or modification. It has been found that dissolved phosphates in wastewaters and sewage effluents can be substantially removed by precipitating the same with calcium chloride at a pH range of 8–9.5. Since most wastewaters have pH's near neutral, any suitable or available base can be used to provide the desired pH range of 8 to 9.5. But because of emphasis on cost and advantages due to common ion effects calcium hydroxide is the base of choice. Of course calcia, (CaO) can be used as well, since it hydrates to lime when added to water.

Dissolved phosphate concentrations in normal domestic wastewater fall in the range of 30 to 50 parts per million (ppm), calculated as $PO_4^{-3}$. This phosphate consists of several forms, each of which has its separate chemical properties. These consist of the particulate organic phosphates tied up in organic matter, orthophosphates and polyphosphates. Generally wastewaters compromise equal parts of the ortho and polyphosphates with the organic phosphates representing a small fraction of the total. The bulk of the polyphosphates is a mixture of pyrophosphates and tripolyphosphates with a minor amount of medium to long-chain polyphosphates.

Polyphosphates are hydrolyzed to the ortho form by enzymatic action and often are in that form by the time they reach the treatment stage. Calcium ions furnished by either $CaCl_2$ and/or $Ca(OH)_2$-$CaCl_2$ combination react rapidly with the orthophosphates to precipitate a crystalline material believed to be a mixed salt of tricalcium phosphates and may be represented by the formula $Ca_5(OH)(PO_4)_3$ or $Ca_3(PO_4)_2 \cdot Ca_2(OH)(PO_4)$.

In normal wastewaters and sewage effluents it has been found that 100 ppm of $CaCl_2$ at pH 8–9.5 will precipitate over 80 percent of the dissolved phosphates. If calcium hydroxide and calcium chloride are used in combination less calcium chloride is needed because of the $Ca^{++}$ ions furnished by the lime. Of course adjustment of the $CaCl_2$ dose may be necessary for exceptional or unusual phosphate concentrations.

The advantage provided by the use of calcium chloride is economically double-edged. As a starting material the cost of $CaCl_2$ is comparable to $Ca(OH)_2$, but more importantly the fear of lime overdosage, i.e., high pH values, is practically eliminated. Thus sophisticated pH control equipment and/or personnel time to monitor them will no longer be a must. This is true even when part of the treatment is lime itself since it is not used to the extent necessary to precipitate all of the phosphates present. Moreover when lime is used alone as the precipitating agent it lacks flocculating properties and the reaction with phosphates does not affect the hydrogen ion concentration. Conversely, calcium chloride reaction is believed to release some hydrogen ions thereby decreasing the pH. Moreover, calcium chloride has been found to possess flocculating characteristics resembling the ferric and ferrous salts in this respect. It can, then, be seen that the use of calcium chloride provides very unexpected results, i.e., some pH control and flocculent action both of which being necessary in the effective removal of soluble phosphates from wastewaters.

To further illustrate the present invention, the following examples are provided showing some specific embodiments of the invention; they are not, however, to be construed as in any way limiting the scope of the invention.

EXAMPLE I

A standard solution of orthophosphate was prepared so that it contained 200 parts per million (ppm) phosphate calculated as $PO_4^{-3}$. Various lower concentrations could be made to match actual samples taken from sewage effluents. Several sources of industrial and municipal wastewaters were examined for phosphate content and shown to contain amounts ranging from 30 to 50 ppm. Of course, some wastewaters may contain considerably higher contents of phosphates if they happen to collect effluents from industrial plants utilizing for example phosphoric acid as in pickling operations.

An aliquot of the standard solution given above was diluted to provide a solution containing 37 ppm of phosphate. The solution was made alkaline by using a suitable base such as sodium hydroxide. The pH was measured to be about 8.10 at which stage 100 ppm of $CaCl_2$ (in the form of an aqueous solution) was added to the phosphate solution. A white precipitate was observed soon after the addition. The precipitate was allowed to settle over a 24-hour period after which the pH of the supernatant solution was measured at 7.10 and the phosphate was shown to have been removed to the extent of 87 percent.

When calcium chloride was added to a similar phosphate sample at pH 7.00 no precipitate was observed. In fact after 24 hour-period the solution was slightly on the acid side as it had a pH of 6.70.

From the above it can be seen that calcium chloride is capable of removing, by precipitation, as high as 87 percent of the phosphate present in solution so long as the addition was made in alkaline media.

Higher amounts of phosphates are, of course, precipitated with calcium chloride by making the solution more alkaline. In Table I there is shown the extent of phosphate precipitation with respect to initial pH and its decrease over 24 hour-period. Data presented in Example I are also included for comparison.

TABLE I

| | | | | |
|---|---|---|---|---|
| $CaCl_2$ added (ppm) | 100 | 100 | 100 | 100 |
| Initial pH | 7.0 | 8.1 | 9.0 | 10.1 |
| Initial $PO_4^{-3}$ (ppm) | 37.0 | 37.0 | 37.0 | 37.0 |
| Final $PO_4^{-3}$ (ppm) | 37.0 | 4.8 | 3.6 | 0.4 |
| % Precipitation | 0 | 87 | 93 | 99 |
| pH after 24 hrs. | 6.7 | 7.1 | 7.9 | 8.4 |

It is obvious that the composition of raw wastewaters would fluctuate and vary from day to day. By and large the pH of the raw wastewaters prior to treatment is close to neutral but on the alkaline side. These waters, however, do contain considerable amounts of dissolved carbon dioxide and bicarbonates which present difficulties in adjusting the pH. In this connection, it should be stated that aeration of wastewaters would aid in removing some of the dissolved carbon dioxide and thus lower the amounts of the base needed to bring up the pH level. Addition of calcium hydroxide is generally done to neutralize acid components of wastewaters and also to effect the precipitation of the soluble phosphates. On a laboratory standard, $Ca(OH)_2$ is excellent at removing phosphates. On wastewaters, however, the matter is not as simple; pH values higher than 9.5, are quite harmful since at such levels most activated sludge operations would cease to function effectively. It is, therefore, extremely important to control the pH. Often it is difficult to do so and lime does not appear very attractive.

EXAMPLE II

To a neutral standard solution containing 37 ppm of $PO_4^{-3}$ 100 ppm of $Ca(OH)_2$ was added (amounts provided herein are based on calculations made with reference to standard solutions. Phosphate was determined by using stannous chloride method for orthophosphates as given in *Standard Method for the Examination of Water and Wastewater*, 12th Edition, page 234. All additions are made via solutions in which ppm are related to volume, i.e., 1 cc contains so many ppm of the particular reagent.) A white precipitate was observed to form very readily. After settling, the pH was shown to be 9.3. Phosphate content in the supernatant solution is 7.0 ppm showing about 82 percent precipitation. It appeared that additional lime was necessary to precipitate the $PO_4^{-3}$ completely. The added increments, however, follow an almost exponential rate. For example a lime addition of 135 ppm precipitated hardly any additional phosphate but did increase the pH to about 9.5. Complete precipitation of the phosphate was not effected until the $Ca(OH)_2$ exceeded 200 ppm and the pH level was over 10.5. Wastewater effluents having a pH of over 9.5 would not be susceptible to further secondary treatment of activated sludge because most bacterial forms cannot survive in such an alkaline medium.

Utilizing the combination of calcium hydroxide and calcium chloride to precipitate phosphates proved to be very effective. Calcium hydroxide will increase the pH to acceptable levels and provide some concentration of calcium ions whereas calcium chloride will help provide additional calcium ions to precipitate the substantial portion of soluble phosphates. Thus to a standard solution containing 37 ppm of $PO_4^{-3}$ was added 50 ppm $Ca(OH)_2$ followed by 50 ppm of $CaCl_2$. The pH was measured at 8.5. Amounts of soluble $PO_4^{-3}$ removed by precipitation were over 80 percent.

Table II shows the analyses of raw sewage waters obtained from the towns of Alma and St. Louis, Mich. By comparison the analyses were typical in that they fell within ranges observed in many towns and areas throughout the country. Fluctuation of values of the various components is also typical with occasional high or low values.

TABLE II

Components of Sewage Effluents from Alma and St. Louis, Michigan

| $PO_4^{-3}$ (ppm) | pH | Bicarbonate as mg $CaCO_{3/1}$ | free $CO_2$ (mg/l) | |
|---|---|---|---|---|
| 39 | 7.5 | | | |
| 30 | 7.6 | | | |
| 28 | 7.7 | 260 | 31 | |
| 53 | 7.6 | 245 | 41 | Alma |
| 38 | 7.5 | | | |
| 34 | | | | |
| 20 | 7.5 | 232 | 18 | |
| 30 | | | | |
| 34 | 7.8 | 440 | 70 | |
| 27 | 7.7 | 400 | 46 | St. Louis |
| 38 | 7.8 | 380 | 77 | |

Table III is intended to show the extent of $PO_4^{-3}$ removal by precipitation utilizing $Ca(OH)_2$, and a combination of $Ca(OH)_2$-$CaCl_2$ on sewage effluents. Of note are the rates of change of pH values and phosphate removal relative to time. During these runs no attempt was made to exclude air. Decreases in pH values were observed and believed to be caused by carbon dioxide. Of course, formation of calcium carbonate can be expected particularly in the case of lime addition when the pH is above 9.5. It is believed that some inhibition of carbonate formation is effected at lower pH values.

TABLE III

Phosphate Precipitation Relative to Time and $pH^{(=)}$

A. $Ca(OH)_2$, 100 ppm

| Time (hr) | pH | $PO_4^{-3}$ (ppm) | $PO_4^{-3}$ precipitated (%) |
|---|---|---|---|
| 0.00 | 7.5 | 25.0 | 0 |
| 0.25 | 9.5 | 6.0 | 76 |
| 0.50 | 9.5 | 5.5 | 78 |
| 1.00 | 9.2 | 3.3 | 87 |
| 2.00 | 9.2 | 3.1 | 88 |
| 3.00 | 9.1 | 3.1 | 88 |
| 4.00 | 9.1 | 3.0 | 88 |
| 24.00 | 9.0 | 3.0 | 88 |

B. $Ca(OH)_2$, 200 ppm

| | | | |
|---|---|---|---|
| 0.0 | 7.5 | 25.0 | 0 |
| 0.25 | 10.4 | 6.0 | 76 |
| 0.50 | 10.2 | 5.3 | 79 |
| 1.00 | 10.2 | 3.3 | 87 |
| 2.00 | 10.1 | 3.1 | 88 |
| 3.00 | 10.1 | 3.1 | 88 |
| 4.00 | 10.0 | 3.1 | 88 |
| 24.00 | 9.7 | 3.1 | 88 |

C. $CaCl_2$, 100 ppm**

| | | | |
|---|---|---|---|
| 0 | 7.5 | 39.0 | 0 |
| 0.5 | 8.1 | 29.0 | 26 |
| 1.0 | 8.2 | 24.2 | 38 |
| 2.0 | 8.3 | 22.2 | 43 |
| 3.0 | 8.3 | 18.3 | 53 |
| 4.0 | 8.3 | 14.0 | 66 |
| 24.0 | 7.8 | 2.7 | 93 |

D. $CaCl_2$, 200 ppm**

| | | | |
|---|---|---|---|
| 0 | 7.5 | 39.0 | 0 |
| 0.5 | 8.2 | 22.0 | 46 |
| 1.0 | 8.2 | 17.6 | 55 |
| 2.0 | 8.3 | 13.7 | 65 |
| 3.0 | 8.3 | 12.1 | 69 |
| 4.0 | 8.4 | 9.0 | 77 |
| 24.0 | 7.8 | 2.4 | 94 |

E. $CaCl_2$, 50 ppm + $Ca(OH)_2$, 50 ppm

| | | | |
|---|---|---|---|
| 0 | 7.5 | 25.0 | 0 |
| 1.0 | 8.7 | 4.5 | 82 |
| 2.0 | 8.5 | 3.7 | 85 |
| 3.0 | 8.5 | 3.3 | 87 |
| 4.0 | 8.4 | 3.0 | 88 |
| 24.0 | 8.0 | 2.4 | 94 |

\* Wastewaters used in this Table were obtained from the sewage effluents of the city of Alma, Michigan.

\*\* Any suitable base can be used to effect the desired pH values. Thus hydroxides such as sodium, potassium, calcium and ammonium hydroxide can be used.

It should be evident from the foregoing specification and examples that the term "wastewater" is employed herein to indicate any raw wastewater or sewage effluent. In fact, the process of the present invention has found an exceptional utility in treating industrial wastewater which is relatively high in phosphate content. Additionally, experience has shown that the amounts of $CaCl_2$ needed to precipitate the phosphates are not considered high with respect to chloride ions pollution. The calcium chloride can be added in solid form or as an aqueous solution. It is preferable that a solution containing 15 to 45 percent by weight of calcium chloride is used since it provides a built-in safety for error, i.e., easier means of addition. Brines containing calcium chloride have been found to be adequate.

What is claimed is:

1. A process for substantially removing dissolved phosphates from wastewater consisting essentially of the steps of adding calcium hydroxide to said water to provide an alkaline waste water having a pH range of from 8 to 9.5, treating said alkaline water with calcium chloride to thereby precipitate and consequently remove the insoluble phosphates formed.

2. A process according to claim 1 wherein calcium hydroxide is added in amounts up to about 50 ppm.

3. A process for treating wastewater to remove at least 80 percent of the phosphates dissolved therein, which process comprises the steps of adding a calcium hydroxide containing calcium chloride to said wastewater and adjusting the pH thereof to be in the range of 8 to 9.5 thereby precipitating the major part of said dissolved phosphates for consequent removal.

* * * * *